United States Patent
Stawiszynski et al.

(10) Patent No.: US 12,477,083 B2
(45) Date of Patent: Nov. 18, 2025

(54) PHYSICAL SECURITY SYSTEM AND METHOD FOR EFFECTING A TEMPORARY ACCESS PERMISSION CHANGE

(71) Applicant: MOTOROLA SOLUTIONS, INC., Chicago, IL (US)

(72) Inventors: Maciej Stawiszynski, Cracow (PL); Pawel Pak, Adamow (PL); Szymon Sikora, Cracow (PL); Jakub Siedlik, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 15 days.

(21) Appl. No.: 18/433,922

(22) Filed: Feb. 6, 2024

(65) Prior Publication Data
US 2025/0254272 A1    Aug. 7, 2025

(51) Int. Cl.
*H04N 7/18* (2006.01)
*G06V 20/40* (2022.01)
*G06V 20/52* (2022.01)
*G07C 9/00* (2020.01)
*G07C 9/20* (2020.01)

(52) U.S. Cl.
CPC ............ *H04N 7/183* (2013.01); *G06V 20/40* (2022.01); *G06V 20/52* (2022.01); *G07C 9/00174* (2013.01); *G07C 9/20* (2020.01); *G06V 2201/08* (2022.01); *G07C 2209/12* (2013.01)

(58) Field of Classification Search
CPC ........ H04N 7/183; G06V 20/40; G06V 20/52; G06V 2201/08; G07C 9/00174; G07C 9/20; G07C 2209/12
See application file for complete search history.

(56) References Cited

U.S. PATENT DOCUMENTS

| | | | |
|---|---|---|---|
| 9,923,918 B2 | 3/2018 | Nicodemus et al. | |
| 9,953,187 B2* | 4/2018 | Rylski | H04N 7/18 |
| 11,586,682 B2 | 2/2023 | Lemay et al. | |
| 11,861,002 B2* | 1/2024 | Shrestha | G06V 20/41 |
| 11,869,262 B1* | 1/2024 | Borenstein | G06T 7/73 |
| 2004/0210926 A1 | 10/2004 | Francis et al. | |
| 2014/0015978 A1* | 1/2014 | Smith | G07B 15/02 348/156 |
| 2016/0019733 A1* | 1/2016 | Robinton | H04W 4/023 340/5.61 |
| 2017/0103647 A1* | 4/2017 | Davis | H04W 12/068 |
| 2017/0301166 A1* | 10/2017 | Earles | G07C 9/00309 |
| 2019/0172281 A1* | 6/2019 | Einberg | G07C 9/00563 |
| 2020/0042775 A1* | 2/2020 | Lim | G06F 18/217 |

(Continued)

FOREIGN PATENT DOCUMENTS

WO    WO-2023097364 A1 *  6/2023

*Primary Examiner* — Jared Walker

(57) ABSTRACT

A physical security system and method for effecting a temporary access permission change are disclosed. The method includes analyzing context information, corresponding to a defined and applied, time-limited video redaction, to responsively define the temporary access permission change impacting a physical access control system of the physical security system. The method also includes effecting the temporary access permission change to at least make entry via an at least one entry barrier of the physical access control system more restricted than before the effecting of the temporary access permission change.

20 Claims, 5 Drawing Sheets

(56) References Cited

U.S. PATENT DOCUMENTS

| | | | |
|---|---|---|---|
| 2020/0211348 A1* | 7/2020 | Wang | H04N 23/61 |
| 2021/0110625 A1* | 4/2021 | Kawase | G07C 9/25 |
| 2021/0127071 A1* | 4/2021 | Rebien | H04N 7/18 |
| 2021/0144223 A1 | 5/2021 | Ourega | |
| 2021/0227271 A1* | 7/2021 | Cox | G06V 10/25 |
| 2021/0264137 A1* | 8/2021 | Rao | G06V 20/52 |
| 2021/0407266 A1* | 12/2021 | Jarvis | G06N 3/02 |
| 2022/0228419 A1* | 7/2022 | Tiso | G08B 13/08 |
| 2022/0335798 A1* | 10/2022 | Slawek | G06K 7/1413 |
| 2022/0366275 A1* | 11/2022 | Phua | G08B 29/185 |
| 2022/0397686 A1* | 12/2022 | Scacchi | G01S 19/485 |
| 2023/0083426 A1* | 3/2023 | Szigeti | G07C 9/00309 |
| | | | 340/5.2 |
| 2023/0089648 A1* | 3/2023 | Peleg | H04N 5/77 |
| | | | 386/285 |
| 2023/0377396 A1* | 11/2023 | Dooley, III | G07C 9/30 |
| 2025/0119599 A1* | 4/2025 | Sze | H04N 21/6332 |

\* cited by examiner

PHYSICAL SECURITY SYSTEM AND METHOD FOR EFFECTING A TEMPORARY ACCESS PERMISSION CHANGE

BACKGROUND

Security systems typically employ video cameras (or other image-capturing devices/sensors) to collect image data such as videos. In some systems, images represented by the image data are displayed for contemporaneous screening by one or more system users (e.g. security personnel) and/or recorded for later review after a security breach. In some modern-day systems, the task of detecting and classifying visual objects of interest may be performed by the system itself. Privacy and confidentiality are also important considerations in security systems, and advancements in privacy masks and redaction are helping in regards to these considerations.

In addition to the security system that includes one or more video cameras, a security system can also include access control apparatus. In this regard, ensuring that only authorized individuals can access protected or secured areas may be crucially important (for example, at an airport, a military installation, office building, etcetera). Protected or secured areas may be defined by physical doors (e.g., doors through which a human may enter) and walls. Protected or secured areas may also be defined in other ways like, for example, by large physical gates (e.g., gates through which a vehicle may enter) and walls.

Access control apparatus may limit entry into protected or secured areas of buildings, rooms within buildings, real property, fenced-in regions, or assets and resources therein, to only those with permission to enter. Thus, an access control system should identify the entity (individual, vehicle, etcetera) attempting to enter the secured area, and verify that the entity is currently authorized to enter.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
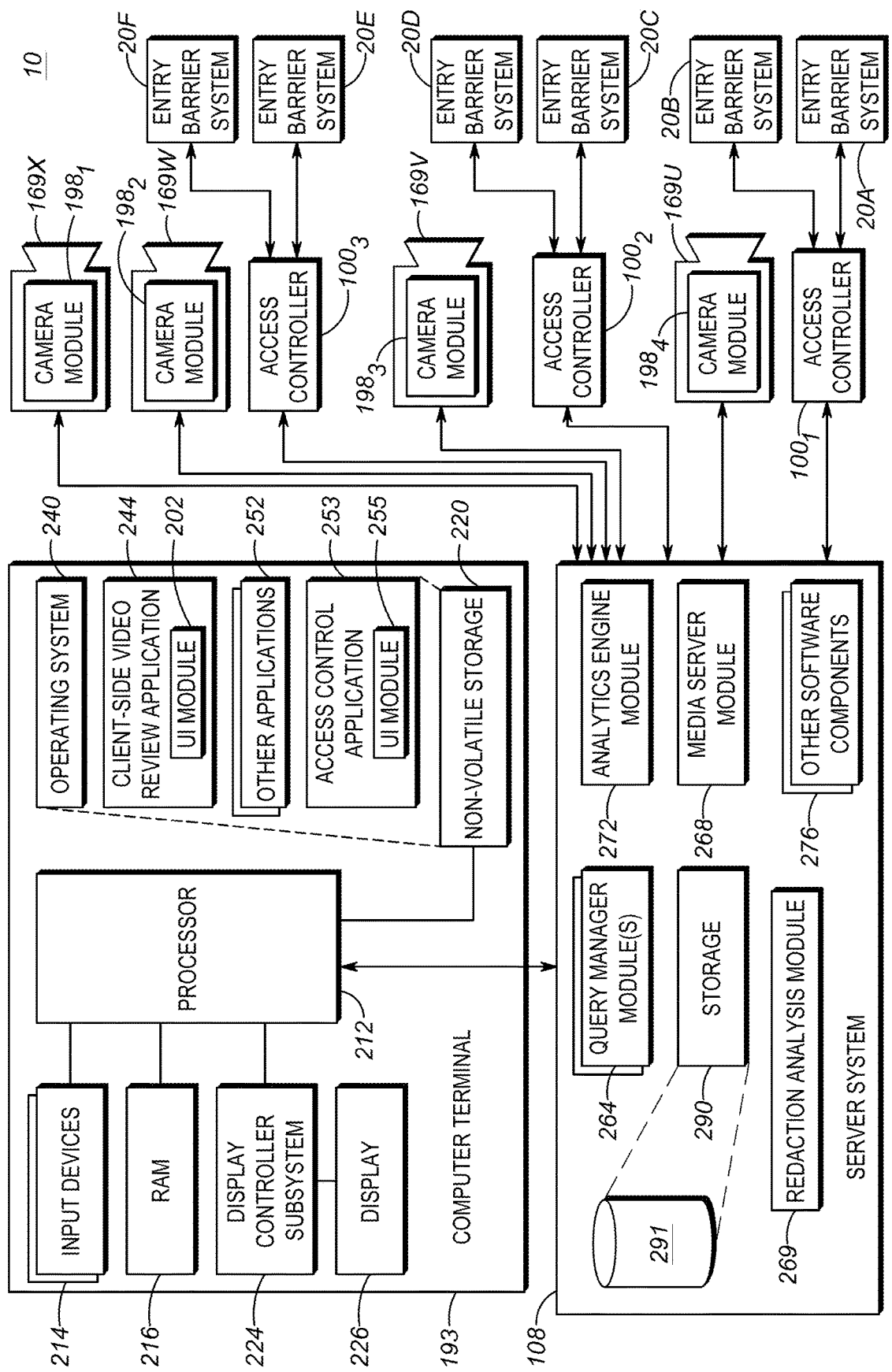
FIG. 1 is a block diagram of a security system according to an example embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method that includes defining and applying a time-limited video redaction to at least a part of a pixel area of images of video captured by a security camera having a Field Of View (FOV). The security camera is operated to monitor a physical area in respect of which entry therein is controlled by a physical access control system that includes at least one entry barrier. The at least one entry barrier is configured to assume any one of least a physical entry-preventing state and a physical entry-allowing state. The computer-implemented method also includes analyzing, using an at least one processor, context information corresponding to the defining and applying of the time-limited video redaction to responsively define a temporary access permission change impacting the physical access control system. The computer-implemented method also includes effecting the temporary access permission change to at least make entry via the at least one entry barrier more restricted than before the effecting of the temporary access permission change.

In accordance with another example embodiment, there is provided an apparatus that integrates with a physical access control system that includes at least one entry barrier at an entry to a physical area in respect of which the entry is controlled by the physical access control system. The at least one entry barrier is configured to assume any one of least a physical entry-preventing state and a physical entry-allowing state. The apparatus includes a security camera having a Field Of View (FOV). The security camera is configured to monitor the physical area and capture video. The apparatus also includes at least one processor within and/or communicatively coupled to the security camera. The apparatus also includes at least one electronic storage medium storing program instructions that when executed by the at least one processor cause the at least one processor to perform: defining and applying a time-limited video redaction to at least a part of a pixel area of images of the video; analyzing context information corresponding to the defining and applying of the time-limited video redaction to responsively define a temporary access permission change impacting the physical access control system; and effecting the temporary access permission change to at least make entry via the at least one entry barrier more restricted than before the effecting of the temporary access permission change.

In some examples, the at least one entry barrier is an at least one door, the physical entry-preventing state is a locked door state, and the physical entry-allowing state is an unlocked door state. In some alternative examples, the at least one entry barrier is an at least gate, the physical entry-preventing state is a closed gate state, and the physical entry-allowing state is an open gate state.

Each of the above-mentioned embodiments will be discussed in more detail below, starting with example system and device architectures of the system in which the embodiments may be practiced, followed by an illustration of processing blocks for achieving an improved physical security system and method for effecting a temporary access permission change.

Example embodiments are herein described with reference to flowchart illustrations and/or block diagrams of methods, apparatus (systems) and computer program products according to example embodiments. It will be understood that at least some of the blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Reference is now made to FIG. 1 which is a block diagram of an example security system 10 within which methods in accordance with example embodiments can be carried out. Included within the illustrated security system 10 (and in which access control is integrated with video camera operation) are one or more computer terminals 193 and a server system 108. In some example embodiments, the computer terminal 193 is a personal computer system; however in other example embodiments the computer terminal 193 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. Furthermore, in some examples the server system 108 may be, in whole or in part, a cloud implementation. As will be appreciated by those skilled in the art, at least some of the functionality of the server system 108 can be implemented within the computer terminal 193 rather than within the server system 108.

The computer terminal 193 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 193 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 193 and the server system 108 are within the same Local Area Network (LAN).

The computer terminal 193 includes at least one processor 212 that controls the overall operation of the computer terminal. The processor 212 interacts with various subsystems such as, for example, input devices 214 (such as a selected one or more of a keyboard, mouse, touch pad, roller ball and voice control means, for example), random access memory (RAM) 216, non-volatile storage 220 and display controller subsystem 224. The display controller subsystem 224 interacts with display 226 and it renders graphics and/or text upon the display 226.

Still with reference to the computer terminal 193 of the security system 10, operating system 240 and various software applications used by the processor 212 are stored in the non-volatile storage 220. The non-volatile storage 220 is, for example, one or more hard disks, solid state drives, or some other suitable form of computer readable medium that retains recorded information after the computer terminal 193 is turned off. Regarding the operating system 240, this includes software that manages computer hardware and software resources of the computer terminal 193 and provides common services for computer programs. Also, those skilled in the art will appreciate that the operating system 240, client-side video review application 244, the access control management application 253, and other applications 252, or parts thereof, may be temporarily loaded into a volatile store such as the RAM 216. The processor 212, in addition to its operating system functions, can enable execution of the various software applications on the computer terminal 193.

Still with reference to FIG. 1, the video review application 244 can be run on the computer terminal 193 and includes a User Interface (UI) module 202 to facilitate, amongst other things, user creation of time-limited video redactions. The illustrated UI module 202 may also be configured to cooperate with a search session manager module and other modules of the video review application 244 in order to enable a computer terminal user to carry out actions related to providing input such as, for example, input to facilitate identifying same individuals or objects appearing in different video recordings. In such circumstances, the user of the computer terminal 193 is provided with a user interface generated on the display 226 through which the user inputs and receives information in relation to the video recordings and associated data.

When the video review application 244 includes the above-mentioned search session manager module, this provides a communications interface between the UI module 202 and a query manager module (i.e. a respective one of the one or more query manager modules 264) of the server system 108. In at least some examples, a search session manager module of the video review application 244 communicates with a respective one of the respective query manager module(s) 264 through the use of Remote Procedure Calls (RPCs). Also, the one or more query manager modules 264 may, in at least one example, enable querying of database(s) to obtain context information of a type described later herein in more detail.

Besides the query manager module(s) 264, the server system 108 includes several software components for carrying out other functions of the server system 108. For example, the server system 108 includes a media server module 268. The media server module 268 handles client requests related to storage and retrieval of video taken by video cameras 169U, 169V, 169W, 169X ("video cameras 169U-169X") in the security system 10. (A single one of the video cameras 169U-169X may herein after be referred to as "video camera 169" for simplicity of reference.) The server system also includes a redaction analysis module 269 that is later herein explained in more detail.

The server system 108 also includes an analytics engine module 272. The analytics engine module 272 can, in some examples, be any suitable one of known commercially available software that carry out mathematical calculations (and other operations) in support of video analytics and computer vision functionality. In some examples the analytics engine module 272 includes one or more learning machines (such as, for instance, one or more convolutions neural networks). In some examples the analytics engine module 272 can use the descriptive characteristics of the person's or object's appearance. Examples of these characteristics include the person's or object's shape, size, textures and color. In some examples, the analytics engine module 272 can facilitate automated redaction of multiple instances of a same person, vehicle or other moving object across a plurality of the video cameras 169U-169X in any suitable manner. For example, US Pat. Publ. No. 2021/0127071 of Rebien et al. teaches leveraging appearance search for this type of redaction; however other alternative implementations (for instance, without involvement of appearance search) are also contemplated.

The server system 108 also includes a number of other software components 276. These other software components will vary depending on the requirements of the server system 108 within the overall system. As just one example, the other software components 276 might include special test and debugging software, or software to facilitate version updating of modules within the server system 108. The server system 108 also includes one or more data stores 290. In some examples, the data store 290 comprises one or more databases 291 which facilitate the organized storing of recorded video. The one or more databases 291 may also facilitate the organized storage of context information, later herein described in more detail, applicable to example embodiments.

Regarding the video cameras 169U-169X, although four video cameras are shown, any suitable number of video cameras is contemplated. Each of the video cameras 169U-169X includes a respective camera module 198. In some examples, the camera module 198 includes one or more specialized integrated circuit chips to facilitate processing and encoding of video before it is even received by the server system 108. For instance, the specialized integrated circuit chip may be a System-on-Chip (SoC) solution including both an encoder and a Central Processing Unit (CPU) and/or Vision Processing Unit (VPU). These permit the camera module 198 to carry out the processing and encoding functions. Also, in some examples, part of the processing functions of the camera module 198 includes creating metadata for recorded video. For instance, metadata may be generated relating to one or more foreground areas that the camera module 198 has detected, and the metadata may define the location and reference coordinates of the foreground visual object within the image frame. For example, the location metadata may be further used to generate a bounding box, typically rectangular in shape, outlining the detected foreground visual object. As will be understood by those skilled in the art, the image within the bounding box may be extracted for inclusion in metadata, and the size of the image being extracted is not necessarily matching in size to the actual boundaries of a detected object and/or the dimensions of the bounding box.

In some examples, the camera module 198 may include a number of conventional submodules for video analytics, the details of which will be readily understood by those skilled in the art. Optionally, one or more learning machines may reside at the camera (such as, for instance, one or more convolution neural networks). Also consistent with such examples, the camera module 198 may be able to detect humans, vehicles, or other self-movable objects and extract images of humans, vehicles or other self-movable objects with respective bounding boxes outlining the objects for inclusion in metadata which, along with the associated video, may transmitted to the server system 108. At the server system 108, the media server module 268 can process extracted images to facilitate generation of, for example, signatures (e.g. feature vectors) to represent objects.

Still with reference to FIG. 1, illustrated entry barrier systems 20A-20F are communicatively linked to the server system 108 through respective access controllers $100_1$-$100_3$. Although six entry barrier systems are shown, any suitable number of entry barrier systems is contemplated. Similarly, although three access controllers are shown, any suitable number of access controllers is contemplated. Also, the one or more databases 291 can include a credential and policy directory (or alternatively the server system could include a separate storage, i.e. distinct from the data store 290, for the purpose of supporting the credential and policy directory).

As will be understood by those skilled in the art, each of the access controllers $100_1$-$100_3$ may log events, and the logs may be configured via an interface provided by a UI module 255 of access control management application 253 to establish any number of devices, services, and systems as event recipients. Some or all of the access controllers $100_1$-$100_3$ may be configured to send the events to a remote monitoring service in any number of formats including, for example, Simple Network Management Protocol (SNMP), Extensible Markup Language (XML) via direct socket connection (Global System for Mobile Communications (GSM), LAN, Wide Area Network (WAN), WiFi™), Syslog, and through a serial port.

The barrier entry systems 20A-20F may incorporate various alarms, such as for a propped open barrier, a stuck unlocked locking mechanism, and other indications of breach or fault.

Figure 2:
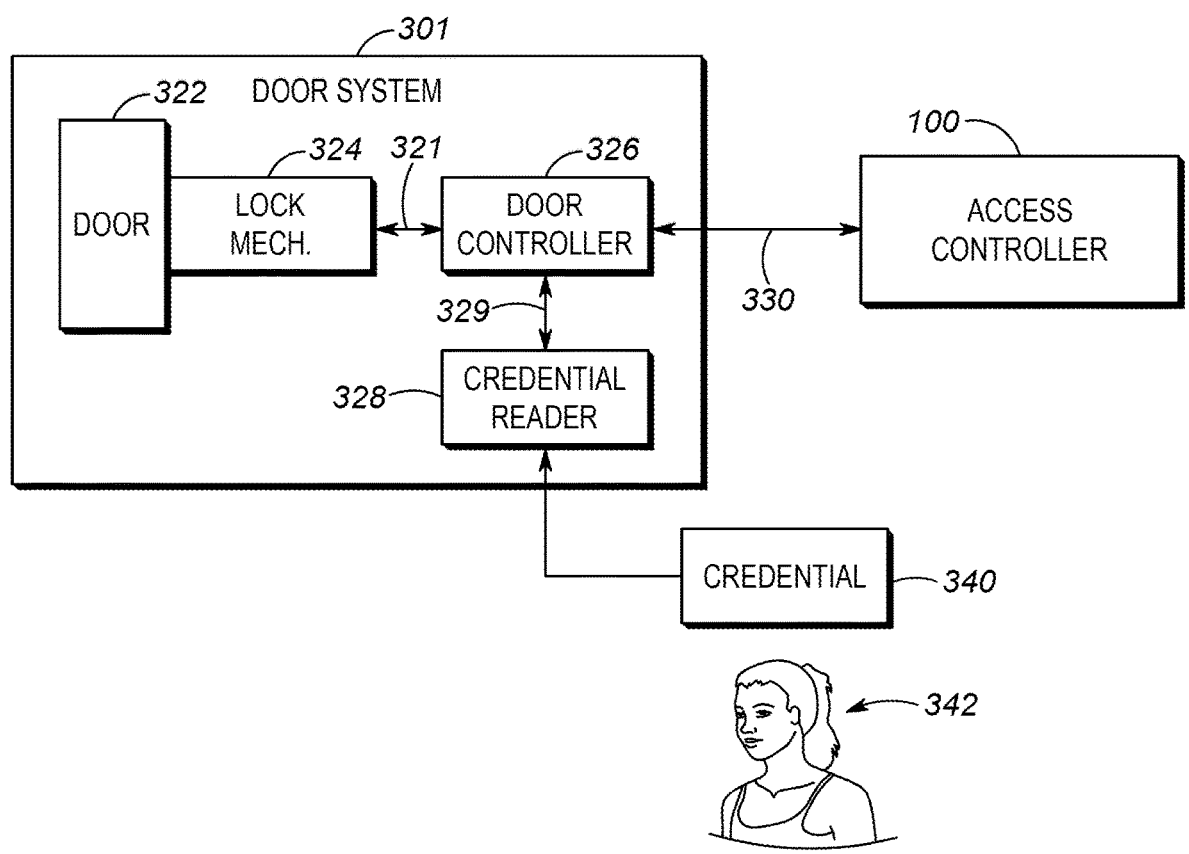
FIG. 2 is another block diagram illustrating details of a door system example of one the entry barrier systems shown in FIG. 1.

Reference is now made to FIG. 2, which shows a block diagram of an individual example of one of the access controllers $100_1$-$100_3$ coupled to a door system example of the entry barrier systems 20A-20F shown in FIG. 1. In FIG. 2, door system 301 is shown in communication with the access controller 100 over signal path 330. The door system 301 includes access door 322, door locking mechanism 324, door controller 326, and access control reader 328 (or credential reader 328). The credential reader 328 may be located physically adjacent a location of the door 322.

The door 322 may be any door that allows individuals to enter or leave an associated enclosed area. The door 322 may include sensor(s). For example, the door 322 may include a position sensor (for example, a limit switch, which is not shown) that indicates when the door 322 is not fully closed. Further details of this or other possible sensors for the door 322 will be known to those skilled in the art without the need for further explanation.

With respect to the illustrated door system 301, the locking mechanism 324 includes a remotely operated electro-mechanical locking element (not shown) such as a dead bolt that is positioned (locked or unlocked) in response to an electrical signal sent over the signal path 321 from the door controller 326.

The door controller 326 receives credential information over a signal path 329 from the credential reader 328 and passes the information to the access controller 100 over another signal path 330. The door controller 326 receives lock/unlock signals from the access controller 100 over the signal path 330. The door controller 326 sends lock mechanism lock/unlock signals over the signal path 321 to the locking mechanism 324.

The credential reader 328 receives credential information 340 for an individual 342. The credential information 340 may be encoded in a Radio Frequency Identification (RFID) chip, a credential on a smart card, a PIN/password input using a key pad, and biometric data such as fingerprint and retina scan data, for example.

The door system 301 operates based on access request signals sent to the access controller 100 and access authorization signals received, in response, from the access controller 100. The door system 301 may incorporate an auto lock feature that activates (locks) the door 322 within a specified time after the door 322 is opened and then shut, after an unlock signal has been sent to the locking mechanism 324 but the door 322 not opened within a specified time, or under other conditions. The auto lock logic may be implemented in the door controller 326 or the locking mechanism 324.

The door system 301 may send event signals to the computer terminal 193 by way of the access controller 100. It is contemplated that a single door system 301 may be used for both entry and egress. Alternatively, it is also contemplated that one door system 301 may be used only for entry and a separate door system 301 may be used only for egress.

However configured, the door systems may trigger the event that indicates when an individual 342 enters an enclosed area and when the individual 342 has exited that enclosed area, based on information obtained by reading credential information 340 of the individual 342 on entry and exit, respectively. These signals may be used to prevent reentry without an intervening exit, for example. The presence or absence of these signals also may be used to prevent access to areas and systems within the enclosed area. For example, the individual 342 may not be allowed to log onto his computer in the respective enclosed area in the absence of an entry signal originating from the door system 301 of the respective enclosed area. Thus, the access controller 100 and its implemented security functions may be a first step in a cascading series of access operations to which the individual may be exposed.

Figure 3:
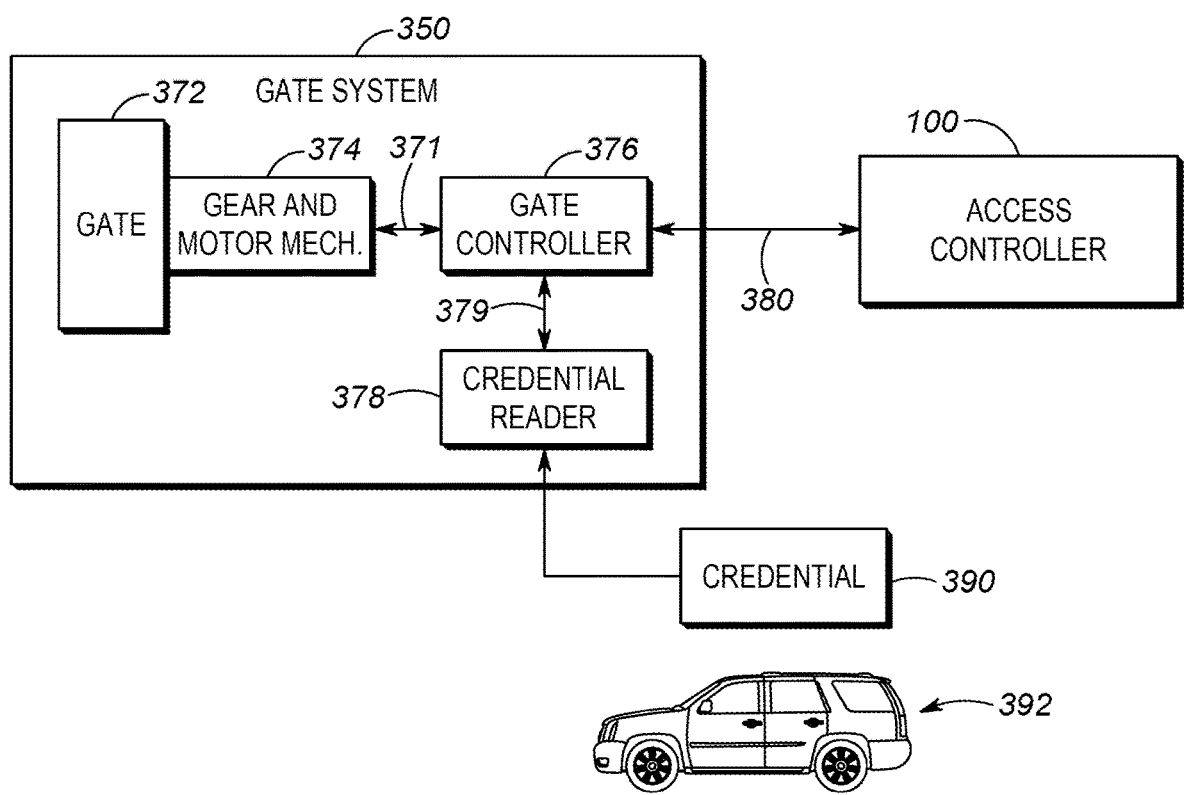
FIG. 3 is another block diagram illustrating details of a gate system example of one the entry barrier systems shown in FIG. 1.

Reference is now made to FIG. 3, which shows a block diagram of an individual example of one of the access controllers $100_1$-$100_3$ coupled to a gate system example of the entry barrier systems 20A-20F shown in FIG. 1. In FIG. 3, gate system 350 is shown in communication with the access controller 100 over signal path 380. The gate system 350 includes access gate 372, gate gear and motor mechanism 374, gate controller 376, and access control reader 378 (or credential reader 378). The credential reader 378 may be located physically adjacent a location of the gate 372.

The gate 372 may be any gate that allows vehicles to enter or leave an associated enclosed parking area (or other type of area within which vehicles traverse). The gate 372 may include proximity sensor(s) to sense an approaching vehicle, and may also include other sensor(s) similar to sensors previously described and mentioned in relation to the door 322 of FIG. 2.

With respect to the illustrated gate system 350, the gear and motor mechanism 374 includes mechanical parts, known to those skilled in the art, to effect movement of the gate 372 in response to an electrical signal sent over the signal path 371 from the gate controller 376.

The gate controller 376 receives credential information over a signal path 379 from the credential reader 378 and passes the information to the access controller 100 over another signal path 380. The gate controller 376 receives actuation control signals from the access controller 100 over the signal path 380. The gate controller 376 sends actuation control signals over the signal path 371 to the gear and motor mechanism 374.

The credential reader 378 receives credential information 390 for a vehicle 392. The credential information 390 may be encoded in a Radio Frequency Identification (RFID) chip, a credential on a smart card, a vehicle license plate (i.e. in those implementations that include a license plate recognition camera), a PIN/password input using a key pad, and biometric data such as fingerprint (e.g. of the vehicle driver) and retina scan data (e.g. of the vehicle driver), for example.

The gate system 350 operates based on access request signals sent to the access controller 100 and access authorization signals received, in response, from the access controller 100. The gate system 350 may incorporate an auto close feature that closes the gate 372 within a specified time after the gate 372 has been opened, or under other conditions. The auto close logic may be implemented in the gate controller 376 or in the gear and motor mechanism 374.

The gate system 350 may send event signals to the computer terminal 193 by way of the access controller 100. It is contemplated that a single gate system 350 may be used for both entry and egress. Alternatively, it is also contemplated that one gate system 350 may be used only for entry and a separate gate system 350 may be used only for egress.

Figure 4:
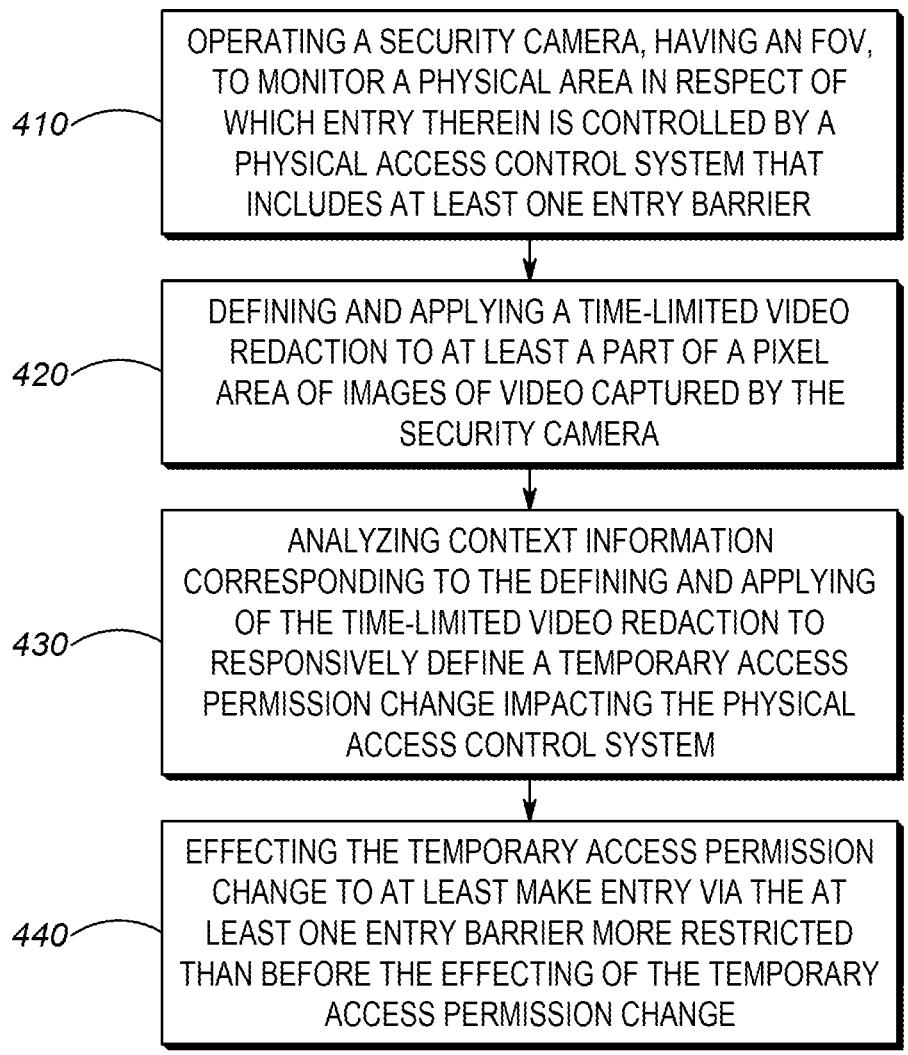
FIG. 4 is a flow chart illustrating a computer-implemented method in accordance with an example embodiment.
Figure 5:
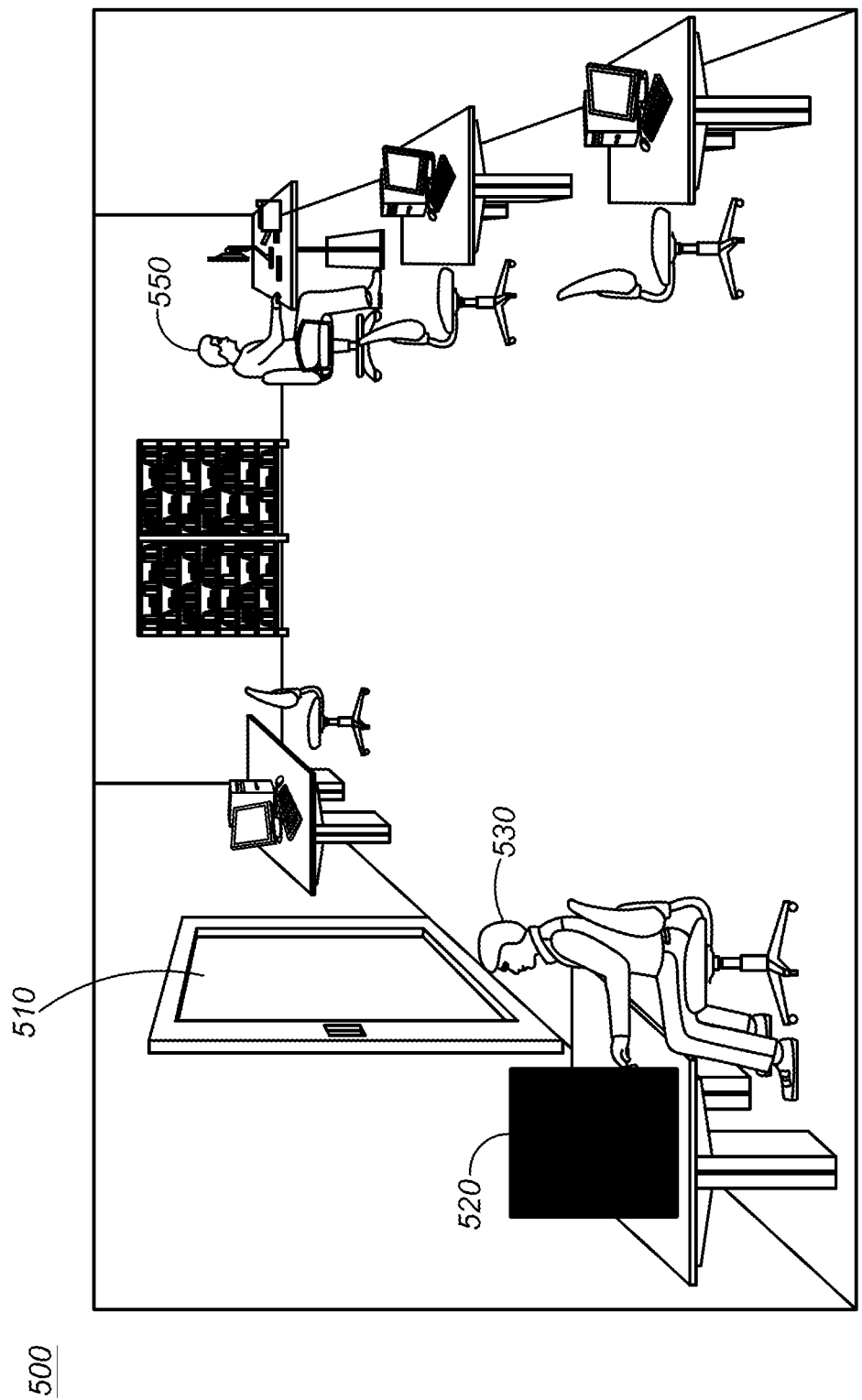
FIG. 5 is a diagram of a room that may be protected by a security system in accordance with an example embodiment.

Reference is now made to FIGS. 4 and 5. FIG. 4 is a flow chart illustrating a method 400 in accordance with an example embodiment. FIG. 5 is a diagram of a room 500 that may be protected by a security system configured to carry out the method 400.

Firstly in the method 400 of FIG. 4, a security camera (for example, the video camera 169) having a Field Of View (FOV), is operated (410) to monitor a physical area in respect of which entry therein is controlled by a physical access control system that includes at least one entry barrier (in respect of the example illustrated in FIG. 5, the physical area is the room 500, and the at least one entry barrier is door 510). The at least one entry barrier is configured to assume any one of least a physical entry-preventing state and a physical entry-allowing state.

In respect of FIG. 5, the door 510 may be similar to the door 322 of FIG. 2. Thus, consistent with the door system 301 that has already been described, the physical entry-preventing state of the door 510 may be a locked state, and a physical entry-allowing state of the door 510 may be an unlocked state.

Next in the method 400 of FIG. 4, a time-limited video redaction is defined and applied (420) to at least a part of a pixel area of images of video captured by a security camera. In the illustrated example of FIG. 5, the time-limited video redaction is redaction 520 covering a workstation screen of first person 530. In some examples, the time-limited video redaction is a time-limited privacy mask, and the time-limited privacy mask redacts a statically defined region of the FOV. In alternative examples, the time-limited video redaction is something else such as, for instance, a redaction that redacts a dynamically defined region of the FOV (the dynamically defined region may, for example, match a moving position of an object temporarily present in the FOV). In at least one example, the dynamically defined region may be a bounding box of the type which has already been herein described.

Next in the method 400, context information, corresponding to the defining and applying of the time-limited video redaction, is analyzed (430) to responsively define a temporary access permission change impacting the physical access control system. Different types of context information are contemplated including, for example, one or more of the following: information about equipment or other inanimate objects within the physical area; information about one or more people within the physical area (for instance, information derived from the previously herein mentioned credential and policy directory); information about the person who created the time-limited video redaction; information about what triggered creation of the time-limited video redaction; and statistical information about people (like illustrated second person 550 and the first person 530) who have previously entered the physical area (for instance, information derived from logged access control event data).

Of important note, one or more learning machines may be employed to intelligently enhance the action 430. In some examples, the action 430 is carried out at least in part by the redaction analysis module 269 of FIG. 1. The redaction analysis module 269 may act upon input from user(s) and stored context information, and thus it will be understood that the redaction analysis module 269 may operably interact with one or more of the following: the UI module 202, the one or more query manager modules 264 and the one or more databases 291.

Next in the method 400, the temporary access permission change is effected (440) to at least make entry via the at least one entry barrier more restricted than before the effecting of the temporary access permission change. The making of the entry via the at least one entry barrier more restricted may include, for example, introducing selectively prompting for a second factor authentication not prompted for before the effecting of the temporary access permission change. As another example, the making of the entry via the at least one entry barrier more restricted may include requiring a person or vehicle attempting to enter a protected physical area to provide respectively assigned access control credentials which were not required before the effecting of the temporary access permission change.

The following is an example of what might occur while the temporary access permission change is in effect. At some point after the temporary access permission change begins, an input is received into the physical access control system of access control credentials assigned to a person or vehicle attempting to enter the physical area (for instance, the room 500 in the case of the FIG. 5 example). The physical access control system which, based on the assigned access control credentials, would normally be caused to change state of the at least one entry barrier (for example, the door 510) from the physical entry-preventing state to the physical entry-allowing state, is caused instead to generate (because of the temporary access permission change) an access denied response.

Of course it will be appreciated that the person or vehicle attempting to enter the physical area (as described above) is not necessarily indefinitely unable to enter the impacted physical area. It is contemplated that at some later point in time (i.e. some time after the action 440) the access permissions are restored to what they were prior to the temporary access permission change.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot apply a time-limited video redaction to a pixel area of images of video captured by a security camera, among other features and functions set forth herein).

In the foregoing specification, specific embodiments have been described. However, one of ordinary skill in the art appreciates that various modifications and changes can be made without departing from the scope of the invention as set forth in the claims below. For example, while rectangular-shaped redactions have been herein shown and described, those skilled in the art will appreciate that redactions other than rectangular-shaped redactions are possible, and thus any suitably shaped redactions are contemplated for redacting consistent with example embodiments.

Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/ or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a LAN or a WAN, or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
defining and applying a time-limited video redaction to at least a part of a pixel area of images of video captured by a security camera having a Field Of View (FOV), the security camera being operated to monitor a physical area in respect of which entry therein is controlled by a physical access control system that includes at least one entry barrier, and the at least one entry barrier being configured to assume any one of least a physical entry-preventing state and a physical entry-allowing state;
analyzing, using an at least one processor, context information corresponding to the defining and applying of the time-limited video redaction to responsively define a temporary access permission change impacting the physical access control system; and
effecting the temporary access permission change to at least make entry via the at least one entry barrier more restricted than before the effecting of the temporary access permission change,
wherein making of the entry via the at least one entry barrier more restricted includes selectively prompting for a second factor authentication not prompted for before the effecting of the temporary access permission change.

2. The computer-implemented method of claim 1 further comprising:
while the temporary access permission change is in effect, recording an input into the physical access control system of access control credentials assigned to a person or vehicle attempting to enter the physical area, and the physical access control system which would normally be caused to change state, based on the assigned access control credentials, of the at least one entry barrier from the physical entry-preventing state to the physical entry-allowing state, is caused instead to generate, because of the temporary access permission change, an access denied response.

3. A computer-implemented method comprising:
defining and applying a time-limited video redaction to at least a part of a pixel area of images of video captured by a security camera having a Field Of View (FOV), the security camera being operated to monitor a physical area in respect of which entry therein is controlled by a physical access control system that includes at least one entry barrier, and the at least one entry barrier being configured to assume any one of least a physical entry-preventing state and a physical entry-allowing state;
analyzing, using an at least one processor, context information corresponding to the defining and applying of the time-limited video redaction to responsively define a temporary access permission change impacting the physical access control system; and
effecting the temporary access permission change to at least make entry via the at least one entry barrier more restricted than before the effecting of the temporary access permission change,
wherein making the entry via the at least one entry barrier more restricted includes requiring a person or vehicle attempting to enter the physical area to provide respectively assigned access control credentials which were not required before the effecting of the temporary access permission change.

4. The computer-implemented method of claim 1 wherein the time-limited video redaction is a time-limited privacy mask, and the time-limited privacy mask redacts a statically defined region of the FOV.

5. The computer-implemented method of claim 1 wherein the time-limited video redaction redacts a dynamically defined region of the FOV, and the dynamically defined region matching a moving position of an object temporarily present in the FOV.

6. The computer-implemented method of claim 1 wherein the context information includes one or more of the following:
information about equipment or other inanimate objects within the physical area;
information about one or more people within the physical area;
information about a person who created the time-limited video redaction;
information about what triggered creation of the time-limited video redaction; and
statistical information about people who have previously entered the physical area.

7. The computer-implemented method of claim 1 wherein the physical access control system further includes at least one access control reader adjacent to the respective at least one entry barrier, the at least one access control reader being configured to receive access control credentials.

8. The computer-implemented method of claim 7 wherein the at least one entry barrier is an at least one door, the physical entry-preventing state is a locked door state, and the physical entry-allowing state is an unlocked door state.

9. The computer-implemented method of claim 7 wherein the at least one entry barrier is an at least gate, the physical entry-preventing state is a closed gate state, and the physical entry-allowing state is an open gate state.

10. Apparatus that integrates with a physical access control system that includes at least one entry barrier at an entry to a physical area in respect of which the entry is controlled by the physical access control system, the at least one entry barrier being configured to assume any one of least a physical entry-preventing state and a physical entry-allowing state, and the apparatus comprising:
a security camera having a Field Of View (FOV), the security camera being configured to monitor the physical area and capture video;
at least one processor within and/or communicatively coupled to the security camera; and
at least one electronic storage medium storing program instructions that when executed by the at least one processor cause the at least one processor to perform:
defining and applying a time-limited video redaction to at least a part of a pixel area of images of the video;
analyzing context information corresponding to the defining and applying of the time-limited video redaction to responsively define a temporary access permission change impacting the physical access control system; and
effecting the temporary access permission change to at least make entry via the at least one entry barrier more restricted than before the effecting of the temporary access permission change, wherein making of the entry via the at least one entry barrier more restricted includes causing a change in the physical access control system to selectively prompt for a second factor authentication not prompted for before the effecting of the temporary access permission change.

11. The apparatus of claim 10 wherein the defining and applying of the time-limited video redaction is carried out within the security camera.

12. The apparatus of claim 10 wherein the at least one processor is at least two processors, and one of the at least two processors carries out both the analyzing the context information and the effecting the temporary access permission change outside of the security camera.

13. Apparatus that integrates with a physical access control system that includes at least one entry barrier at an entry to a physical area in respect of which the entry is controlled by the physical access control system, the at least one entry barrier being configured to assume any one of least a physical entry-preventing state and a physical entry-allowing state, and the apparatus comprising:
- a security camera having a Field Of View (FOV), the security camera being configured to monitor the physical area and capture video;
- at least one processor within and/or communicatively coupled to the security camera; and
- at least one electronic storage medium storing program instructions that when executed by the at least one processor cause the at least one processor to perform:
  - defining and applying a time-limited video redaction to at least a part of a pixel area of images of the video;
  - analyzing context information corresponding to the defining and applying of the time-limited video redaction to responsively define a temporary access permission change impacting the physical access control system; and
  - effecting the temporary access permission change to at least make entry via the at least one entry barrier more restricted than before the effecting of the temporary access permission change,
- wherein making of the entry via the at least one entry barrier more restricted includes causing a change in the physical access control system to require a person or vehicle attempting to enter the physical area to provide respectively assigned access control credentials which were not required before the effecting of the temporary access permission change.

14. The apparatus of claim 10 wherein the time-limited video redaction is a time-limited privacy mask, and the time-limited privacy mask redacts a statically defined region of the FOV.

15. The apparatus of claim 10 wherein the time-limited video redaction redacts a dynamically defined region of the FOV, and the dynamically defined region matching a moving position of an object temporarily present in the FOV.

16. The apparatus of claim 10 wherein the context information includes one or more of the following:
- information about equipment or other inanimate objects within the physical area;
- information about one or more people within the physical area;
- information about a person who created the time-limited video redaction;
- information about what triggered creation of the time-limited video redaction; and
- statistical information about people who have previously entered the physical area.

17. The apparatus of claim 10 wherein the at least one entry barrier is an at least one door, the physical entry-preventing state is a locked door state, and the physical entry-allowing state is an unlocked door state.

18. The apparatus of claim 10 wherein the at least one entry barrier is an at least gate, the physical entry-preventing state is a closed gate state, and the physical entry-allowing state is an open gate state.

19. The computer-implemented method of claim 3 wherein the context information includes one or more of the following:
- information about equipment or other inanimate objects within the physical area;
- information about one or more people within the physical area;
- information about a person who created the time-limited video redaction;
- information about what triggered creation of the time-limited video redaction; and
- statistical information about people who have previously entered the physical area.

20. The apparatus of claim 13 wherein the context information includes one or more of the following:
- information about equipment or other inanimate objects within the physical area;
- information about one or more people within the physical area;
- information about a person who created the time-limited video redaction;
- information about what triggered creation of the time-limited video redaction; and
- statistical information about people who have previously entered the physical area.

* * * * *